Dec. 19, 1933.   B. VAN DER POL ET AL   1,940,472
INTERFERENCE ELIMINATOR
Filed Aug. 6, 1931

INVENTORS
BALTHASAR VAN DER POL
JOHAN WILLEM ALEXANDER
BY
ATTORNEY

Patented Dec. 19, 1933

1,940,472

UNITED STATES PATENT OFFICE 1,940,472

INTERFERENCE ELIMINATOR

Balthasar van der Pol and Johan Willem Alexander, Eindhoven, Netherlands, assignors to Radio Corporation of America, a corporation of Delaware Application August 6, 1931, Serial No. 555,438, and in Germany January 22, 1931

1 Claim. (Cl. 171—97)

This invention has reference to an electric motor or other machine and has for its object to provide means by which, such machines interfere to a less degree with broadcasting or other wireless transmissions than has been the case hitherto. It is commonly known that electric motors, for example, sewing machine motors, interfere to a great extent with the reception of wireless signals. For the purpose of annulling such disturbances it has been proposed to connect across the connecting terminals of the motor a condenser, if required in series with one or more choke coils included in the leading-in conductors. Although frequently this means leads to a considerable decrease in interference, it does not answer always.

The invention is based on the recognition of the fact that an essential source of interference consists in that electric machines are generally asymmetrical for high frequency.

According to the invention, for obtaining this symmetry the brushes have connected between them an impedance constituting practically a short-circuit for high frequencies. Thus it is ensured that the two brushes possess identical high frequency potential.

According to the invention, the interference may be further decreased by shunting by means of high frequency short-circuits those parts of the total circuit that may bring about differences in high frequency voltage between the brushes and the supply conductor.

A similar result may be obtained by such a construction of a motor in which the mutual capacities in relation to the frame and the inductances in the left hand half of the motor are identical with those of the right hand half. It has already been proposed in connection with series motors to arrange the actuating coil on either side of the armature coil. According to the invention, it is however, important that the two coils should be perfectly equalized for high frequency. In the well known construction no regard is had to this and although in principle the construction of a motor of the type here involved is symmetrical, this symmetry is not adjusted accurately enough for existing high frequency currents.

In order that the invention may be clearly understood and readily carried into effect two forms of construction in accordance therewith will now be described more fully with reference to the accompanying drawing, wherein:—

Figure 1:
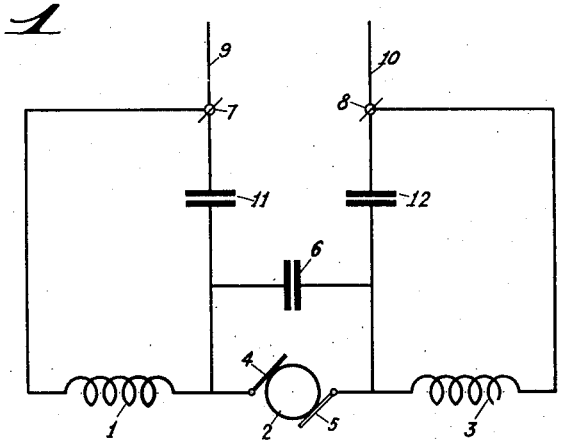
Figure 2:
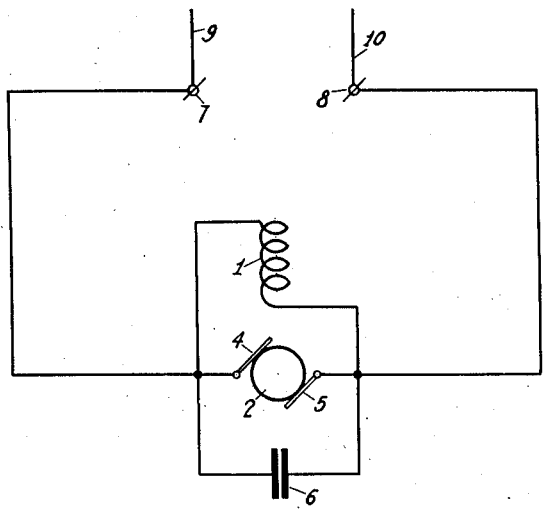

Figures 1 and 2 are diagrammatic views showing the invention applied to a series motor and a shunt motor, respectively.

Figure 1 shows a series motor having an armature coil 2 and an actuating coil consisting of two portions 1 and 3 arranged on either side of the armature coil 2. The brushes are designated by 4 and 5 and 6 designates a condenser possessing practically no impedance for high frequencies so that the points 4 and 5 possess identical potential for high frequency. The connecting terminals of the motor are designated by 7 and 8.

Disturbances are brought about essentially by the production of sparks on the brushes 4 and 5. If the distribution of the inductances between the point at which the spark is produced and the two supply conductors 9 and 10 is asymmetrical, generally a powerful disturbance is brought about. If on the other hand the distribution is symmetrical, the disturbance is materially weaker. Probably, this may be explained as follows. With a symmetrical distribution the current intensity in the two conductors 9 and 10 which is produced when a spark occurs on one of the brushes is identical. As generally the conductors 9 and 10 are very close to each other, the external field is very feeble when the currents are identical. If the distribution of the inductances is asymmetrical, the current intensity in the conductors 9 and 10 is, also by reason of different earth capacities not identical. The disturbance emanating from one of the conductors, is balanced only in part by that of the other conductor so that a powerful resulting field remains.

It is, of course, obvious that the invention is not bound to the explanation given hereinbefore which serves only as an endeavor to make the operation of the circuit arrangement according to the invention comprehensible. If desired, the brushes and terminals may have arranged between them in addition a high frequency short circuit 11 and 12 respectively.

The device thus obtained has at first sight very similar properties with the circuit arrangement in which the condenser is connected between the terminals of the motor. It has, however, been found that the circuit arrangement according to the invention is considerably more effective, principally by reason of the direct short-circuit of the brushes which is not resorted to in the well known circuit arrangement. When applying the invention there is no need for the frame to be earthed.

If current limiting resistances are used they if desired including the connecting conductors to those resistances may be shunted by a high frequency short-circuit.

Figure 2 shows a shunt motor comprising similarly a high frequency short-circuit viz. the condenser 6 between the brushes 4 and 5. The same remarks as those made in connection with Figure 1 apply to this figure.

We claim:

In combination with an electric motor or dynamo-electric machine having a series field winding divided into two substantially symmetrical parts each part being associated with one of the two brushes of the motor, means for preventing interference with signalling devices by said motor when operating, comprising in combination with the motor assembly a condenser connected directly across the motor brushes and forming therewith and with the motor armature a comparatively small dimensioned high frequency loop circuit which, due to its comparatively small dimensions, possesses poor radiation efficiency whereby high frequency currents, due to sparking and the like existing between cooperating, moving and stationary elements of the motor are, in effect, made to traverse said loop circuit thereby substantially preventing radiation of said high frequency currents and means comprising condenser elements shunted across each portion of said field winding for balancing each portion of said field winding whereby all of said portions possess identical characteristics thereby causing high frequency currents existing in one portion to be neutralized by the high frequency currents existing in another portion.

BALTHASAR van der POL.
JOHAN WILLEM ALEXANDER.